May 2, 1939.  O. LARSEN  2,156,788

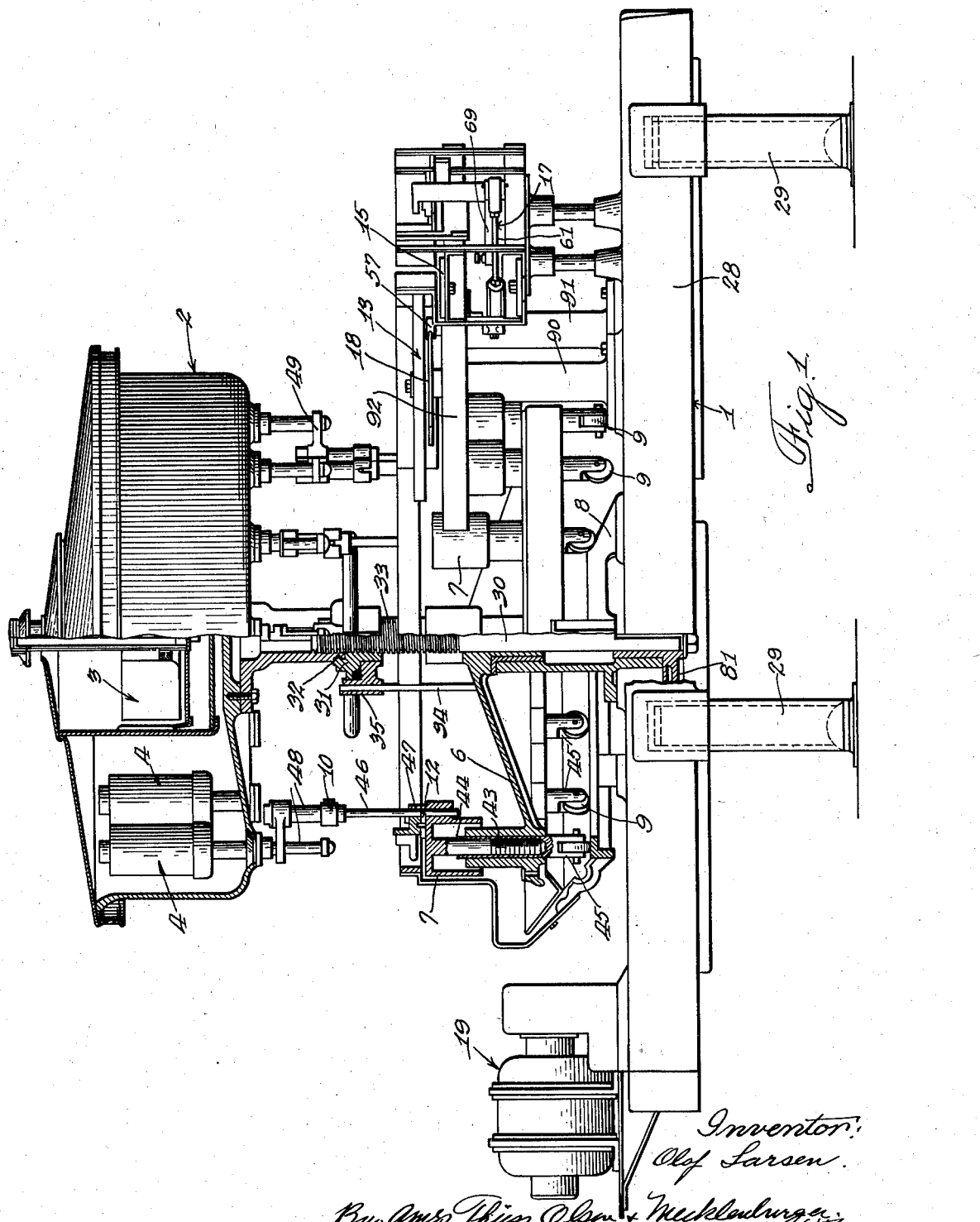

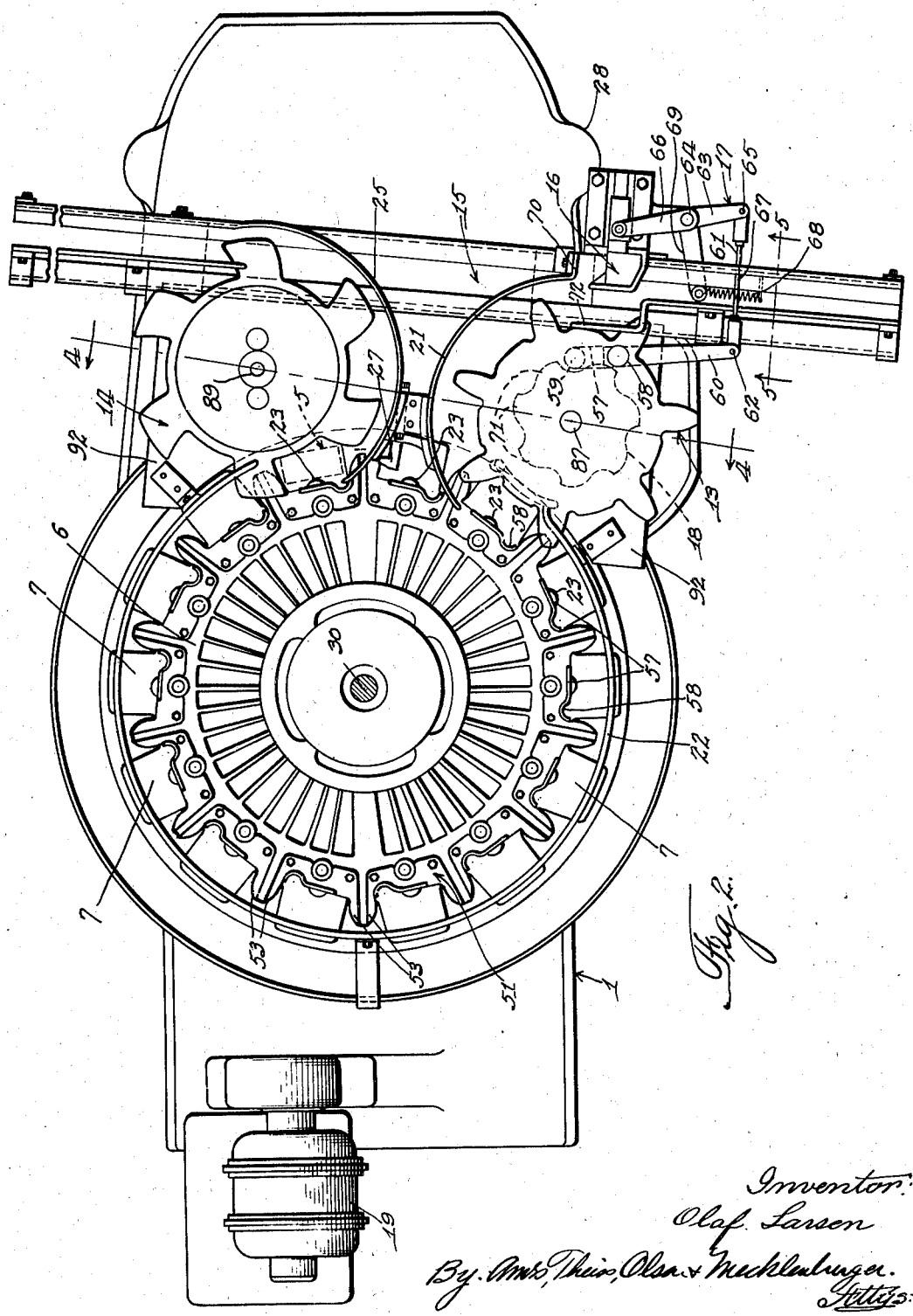

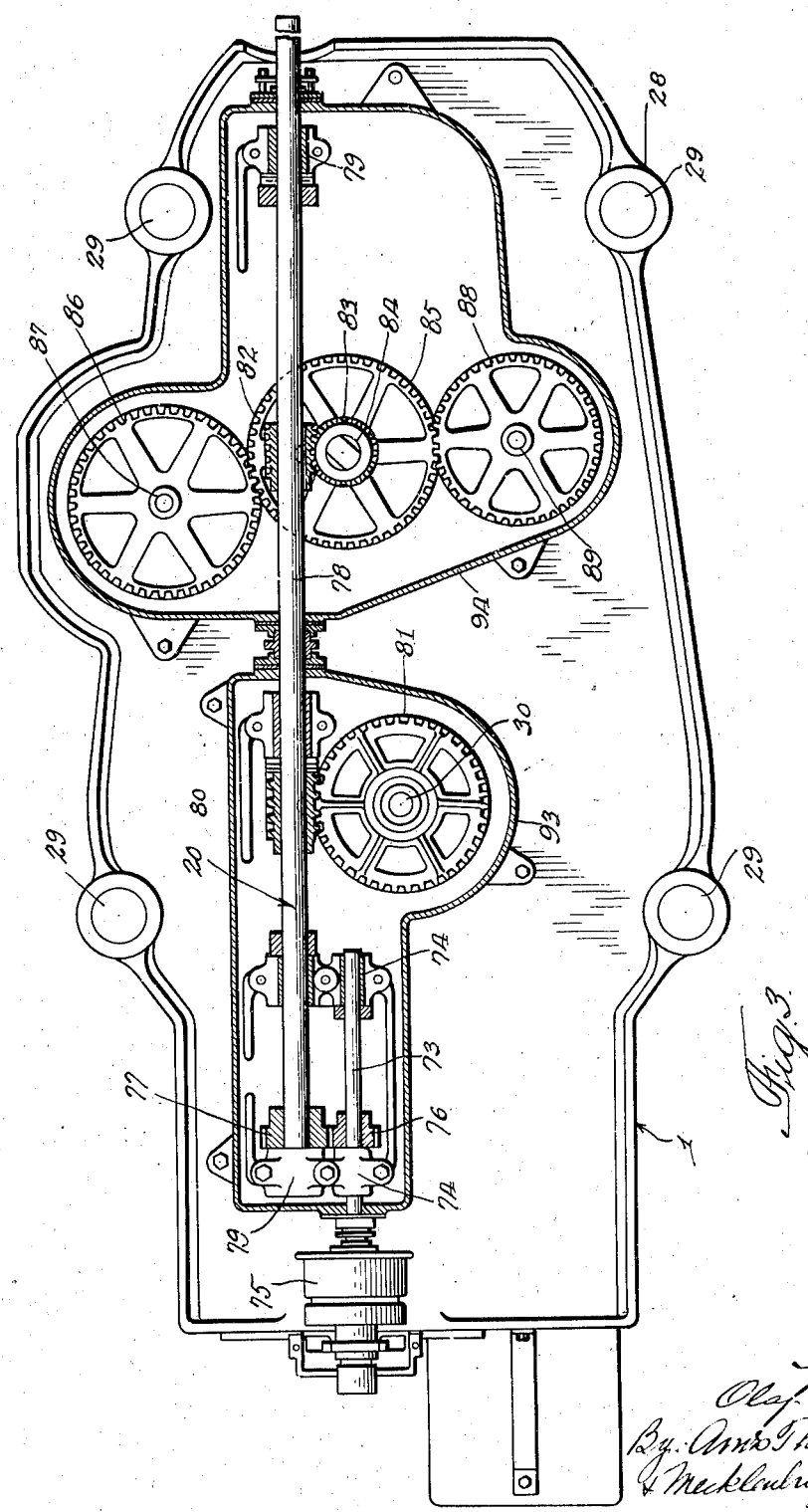

LIQUID MEASURING AND FILLING APPARATUS

Filed Nov. 8, 1937  5 Sheets-Sheet 4

Inventor:
Olof Larsen.
By Amso, Thiers, Olson & Mecklenburger
Attys.

May 2, 1939.  O. LARSEN  2,156,788
LIQUID MEASURING AND FILLING APPARATUS
Filed Nov. 8, 1937  5 Sheets-Sheet 5
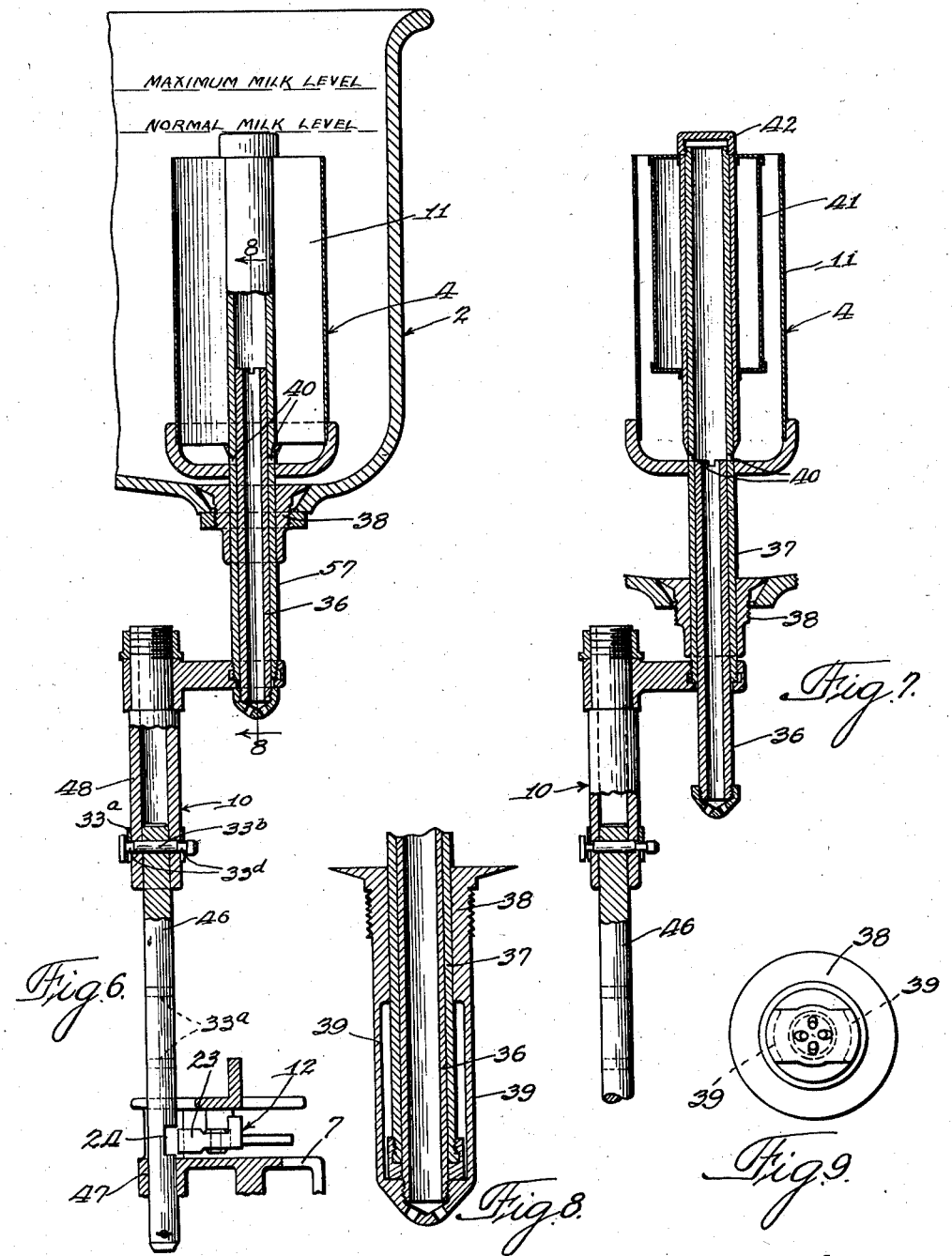

Patented May 2, 1939

2,156,788

UNITED STATES PATENT OFFICE 2,156,788

LIQUID MEASURING AND FILLING APPARATUS

Olaf Larsen, Oak Park, Ill., assignor to The Creamery Package Mfg. Company, Chicago, Ill., a corporation of Illinois Application November 8, 1937, Serial No. 173,320

4 Claims. (Cl. 226—97)

My invention relates to liquid measuring and filling apparatus.

One of the objects of my invention is to provide such apparatus which will be suitable for delivering measured quantities of liquid to containers formed of fragile or pliable material, such as fiber or paper containers now used for milk, etc.

In measuring and filling apparatus for containers of pliable material, it is not advisable to use apparatus of the type commonly used for filling bottles, as the material of the container is not sufficiently rigid to be used in controlling the filling valves of such apparatus.

A further object of my invention, therefore, is to provide improved means of controlling the measuring and filling apparatus, which will be controlled by the presence or absence of a container in a position to be filled and which can be used with containers formed of pliable material.

Further objects and advantages of the invention will be apparent from the description and claims.

In the drawings, in which an embodiment of my invention is shown,

Figure 1 is a side elevational view of a measuring and filling apparatus;

Fig. 2 is a plan view of Fig. 1, the liquid reservoir being removed;

Fig. 3 is a bottom view of Fig. 1, showing the transmission;

Fig. 6 is an axial sectional view showing one of the measuring and filling cups and associated parts with the cup in filling position;

Fig. 7 is a view similar to Fig. 6 showing the cup in raised discharge position;

Fig. 8 is a section on the line 8—8 of Fig. 6;

Fig. 9 is a bottom view of Fig. 8;

Figure 10:
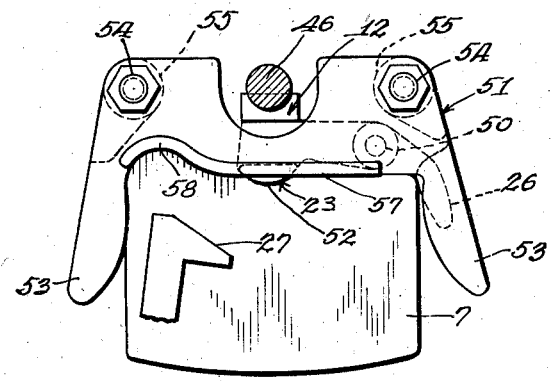
Fig. 10 is a plan view showing a container-receiving holder.

Referring to the drawings in detail, the construction shown comprises a base 1, a liquid reservoir 2 mounted on said base to rotate about a vertical axis, a float valve construction 3 for controlling the liquid level in the liquid reservoir 2, a plurality of measuring and discharge devices 4 for delivering measured quantities of liquid from the reservoir 2 to the pliable containers 5, a container-supporting head 6 underneath and rotatable with the liquid reservoir 2 for presenting containers into filling position with respect to the measuring and discharge devices 4, a plurality of container holders 7 vertically reciprocable in said rotary head 6 on which holders the containers 5 are supported in their movement toward and away from the filling devices 4, a stationary cam 8 engageable by rollers 9 (Fig. 1) on the lower ends of the holders 7 for causing reciprocation of the container holders 5 as the head 6 rotates, transmission 10 between each container holder 7 and one of the measuring devices 4 for causing the discharge of the liquid in the measuring cup 11 (Figs. 6 and 7) when the container holder 7 is lifted, means 12 for connecting and disconnecting this transmission 10 between the holder and the measuring device controlled by the presence or absence of a container 5 on the holder 7, a rotary pocketed wheel 13 for feeding the containers 5 (Figs. 1, 2, and 4) to the holders 7 as the head 6 rotates, a rotary pocketed feed wheel 14 for removing the containers from the holders 7 as the head 6 rotates, a conveyor 15 for supplying containers to the rotary feed wheel 13 and for removing them from the rotary discharge wheel 14, a reciprocating plunger 16 (Figs. 2 and 5) for feeding the containers from the conveyor 15 into the pockets of the feed wheel, a cam-controlled transmission 17 for controlling the reciprocation of the feed plunger 16 controlled by a cam wheel 18 which rotates with the feed wheel 13, an electric motor 19, and transmission 20 (Fig. 3) from the electric motor to the rotary head 6, the rotary liquid reservoir 2, the rotary feed wheel 13, the rotary discharge wheel 14, and the conveyor 15 controlling the delivery and discharge of the container.

Figure 11:
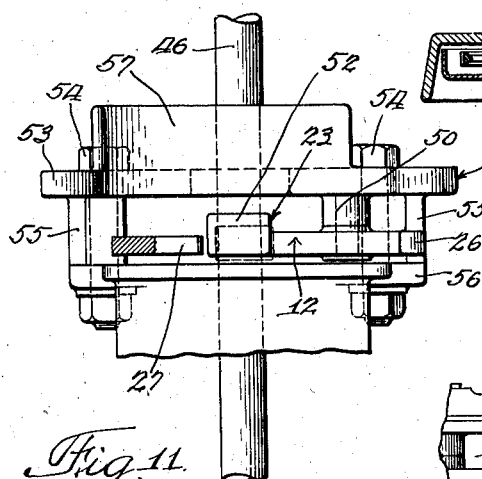
Fig. 11 is a side elevation of Fig. 10.

Before describing in further detail the structure, I will outline in a general way the operation of the apparatus. The level of the liquid in the rotary container 2 is maintained at a definite level by means of the float valve construction 3. The motor 19 is put in operation to cause rotation of the reservoir 2, the rotary head 6, the feed wheel 13, and the discharge wheel 14, and to cause travel of the conveyer belt 15. Containers are supplied to the conveyer belt 15 in any suitable manner. As the conveyer belt 15 travels, the feed plunger 16 is periodically reciprocated to push a container from the conveyer into a pocket in the feed wheel 13. The feed wheel 13 carries the container around with it, the container being guided in this movement by the arcuate guide 21 (Fig. 2). The feed wheel 13 is so timed that as it rotates the pockets in this feed wheel will register with the pockets in the rotary head 6. The containers are thus delivered from the pockets in the feed wheel 13 to the pockets in the rotary head 6, the bottom of the containers resting on the upper ends of the reciprocable container holders 7. The containers are removed from the feed wheel 13 and caused to travel along with the rotary head by means of the arcuate guide strip 22 (Fig. 2). As a holder 7 carrying a container travels along after leaving the feed wheel 13, the container holder 7 is lifted up by the engagement of the roller 9 with the stationary cam 8. As the container is fed into the pocket in the rotary head, it engages a latch lever 23 mounted on the holder 7, which latch lever engages a notch 24 in the lift rod 10 (Figs. 6, 10, and 11) so that when later on the container holder is elevated it will raise with it this lift rod 10 which controls the measuring and discharge of a quantity of liquid from the reservoir 2. If no container is present on a holder, the latch 23 will not be pushed into the notch 24 in the lift rod 10 so that no measuring and discharge for this container holder will take place. After the lifting of the rod starts the discharge of the liquid from the measuring cup 11, the container 5 travels along underneath the discharge opening from the measuring cup 11 and receives the measured quantity of liquid. The lift rod 10 is maintained in its elevated position during the major part of the revolution of the rotary head 6 so that the measuring cup 11 has ample time to empty itself into the container. Shortly before the container 5 reaches the discharge wheel 14, the cam 8 allows the container holder 7 to lower, causing the closing of the discharge valve from the measuring cup so that no further liquid is discharged to the container. The discharge wheel 14 is so timed that its peripheral pockets register with the container holders and the containers are removed from the rotary head 6 and caused to travel along in the pockets of the discharge wheel 14, being guided and held therein by the arcuate guide 25 (Fig. 2). Shortly after the container 5 has been removed from the holder 7 by the discharge wheel 14, the latch-returning arm 26 of the latch lever 23 strikes a stationary cam member 27 (Figs. 2, 10, and 11) which causes the withdrawal of the latch 23 from the notch 24 in the lift rod 10, thus breaking the connection in the transmission between the container holder 7 and the measuring and discharge device 4.

The base 1 comprises a horizontal base plate 28 (Figs. 1, 2, and 3) on which the operating parts are supported, this horizontal base plate being supported by suitable legs 29. The liquid reservoir 2 is mounted on a vertical rotatable shaft 30 on which the rotary head 6 also is mounted, the reservoir 2 and the head 6 rotating together with the shaft. In order to adjust the height of the reservoir 2 with respect to the head 6, an adjusting nut 31 (Fig. 1) is provided threaded on the upper end of the rotary shaft 30, the nut having a swivel connection at 32 with the reservoir 2 and the reservoir being splined with respect to the rotary shaft 30. With this construction, the rotation of the nut 31 on the threaded portion 33 of the shaft will cause a vertical adjustment of the reservoir 2 on the shaft. This vertical adjustment of the reservoir enables the apparatus to be used satisfactorily with containers of different heights. For a high container the reservoir is raised, and for a shorter container the reservoir is lowered. When an adjustment of the reservoir is made it may also be necessary to make a corresponding adjustment in the length of the lift rods 10. This may be accomplished by providing the lower section of the lift rod with a number of holes 33a into any one of which the pin 33b which extends through registering openings in the upper section of the lift rod may be inserted. This pin 33b may be held in adjusted position by means of a slip collar 33c having notches in its lower edge to receive reduced portions 33d of the pin.

In order to indicate the relative spacing of the reservoir 2 and the rotary head 6, a gauge rod 34 is slidably mounted in a sleeve 35 carried by the rotatable nut 31. The lower end of this gauge rod 35 rides on the upper surface of the rotary head 6 as the nut 31 is rotated. As the nut 31 is adjusted to move it up or down, this gauge rod 34 will slide in the sleeve 35. By providing the gauge rod 34 with suitable scale markings adjacent the sleeve 35, the distance of the reservoir 2 from the rotary head 6 may be determined. The float valve construction 3 may be of any usual or suitable construction which will maintain the desired liquid level in the reservoir 2.

Each of the measuring and discharge devices 4 comprises the measuring cup 11 (Figs. 6 and 7) reciprocable up and down in the reservoir 2 from a position in which its upper edge is below the liquid level to enable the measuring cup 11 to be filled with liquid to a position in which the upper edge of the measuring cup is above the liquid level to enable the measured quantity of liquid in the cup to be discharged through the discharge tube 36 into the container on the holder underneath. For effecting this reciprocation of the measuring cup 11, the cup is mounted on a sleeve 37, which sleeve is reciprocable up and down in a bushing 38 in the bottom of the reservoir 2. For controlling the discharge from the measuring cup 11, the discharge tube 36 is mounted on a pair of arms 39 (Figs. 8 and 9) extending downwardly from and carried by the bushing 38, and the sleeve 37 on which the measuring cup 11 is mounted engages this discharge tube 36 telescopically. To enable the discharge of the liquid from the measuring cup, openings 40 are provided in the sleeve 37 so that when the sleeve and measuring cup are in the raised position shown in Fig. 7, these openings 40 in the sleeve will rise above the upper end of the discharge tube 36 and afford communication between the interior of the measuring cup 11 and the discharge tube 36, allowing the liquid from the measuring cup to flow down through the discharge tube 36 into the container. In order to change the capacity of the measuring cup 11, an annular displacement chamber 41 (Fig. 7) may be provided which may be slipped on and over the upper end of the sleeve 37 and secured in position by means of a nut 42 threaded on the end of the sleeve. This displacement chamber 41 lessens the capacity of the measuring cup 11 thus changing the quantity of liquid which will be measured out and delivered.

Each reciprocable container holder is provided with a threaded shank 43 screwed into a sleeve 44 slidably, but non-rotatably, mounted in the head 6, the sleeve being provided at its lower end with a yoke 45 in which the rollers 9 are mounted.

The transmission 10 between the holder 7 and the reciprocable sleeve 37 on which the measuring cup 11 is mounted comprises the notched rod 46 reciprocable in an opening in a boss 47 of the container holder 7, a sleeve 48 telescopically engaging this rod, and an arm 49 secured to the upper end of this sleeve, into which arm is screwed the lower end of the cup-supporting sleeve 37. The latch construction for connecting and disconnecting the holder 7 with respect to the lift rod 46 comprises the latch lever 23 pivotally mounted on a pin 50 secured to a bracket 51 on the container holder 7, this latch lever having a container-engaging portion 52 against which the container 5 presses as it is fed inwardly into the pocket in the container holder and a finger portion 26 which engages the stationary release cam 27 after the container 5 has been removed from the holder. The container-receiving pocket in the holder is provided by means of a pair of radially-extending arms 53 on the bracket 51 secured to the holder 7. This bracket 51 may be secured to the holder 7 by means of bolts 54 extending through the supporting posts 55 in the bracket and through registering openings in the flange 56 of the container holder.

The bracket 51 is provided with an upwardly extending flange 57 to aid in positioning the container in the pocket, this flange being curved somewhat at 58 to facilitate the transfer of the container 5 from the feed wheel 13 to the pocket.

The cam-controlled transmission 17 (Figs. 1, 2, and 5) between the cam wheel 18 and the feed plunger 16 comprises a lever 57 mounted on a rock shaft 58 and having a follower 59 engaging the rotary cam wheel 18, a rock arm 60 mounted on the rock shaft 58, a link 61 pivotally connected at 62 to this rock arm 60, a rock arm 63 mounted on a rock shaft 64 and pivotally secured at 65 to the link 61, and a rock arm 66 mounted on the rock shaft 64 and operatively connected at its swinging end with the feed plunger 16. In order to effect the feeding movement of the feed plunger 16, a coil tension spring 67 is provided, secured at one end to a pin 68 and at its other end to a rock arm 69 on the rock shaft 64 on which the plunger-actuating arm 66 is mounted. As the cam wheel 18 rotates, the follower 59 rides along the periphery of the cam, causing the withdrawal of the feed plunger 16 from the path of the incoming containers. This enables the conveyor 15 to feed a container in front of the feed plunger 16 and against a stop 70 (Fig. 2) provided in the path of the containers. Shortly after the container is fed against this stop 70, the follower 59 drops off the steep edge of the cam projections 71 on the cam wheel 18 and the spring 67 effects a quick feeding movement of the plunger 16 to move the container 5 against the guide members 72 (Figs. 2 and 5) between which the projections on the feed wheel 13 operate. The timing is such that a pocket in the feed wheel 13 will be opposite the container 5 as it is pushed toward the feed wheel by the feed plunger 16. The continued rotation of the feed wheel 13 carries the container away from the feed plunger 16 and towards the pockets in the rotary head 6.

Figure 4:
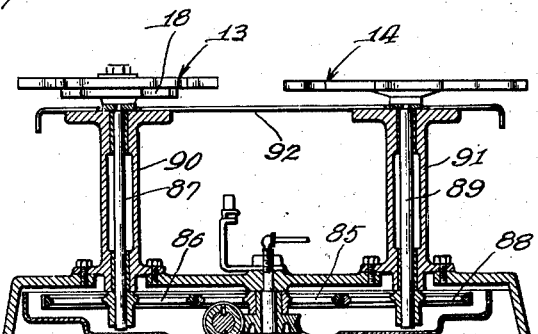
Fig. 4 is a section on the line 4—4 of Fig. 2.
Figure 5:
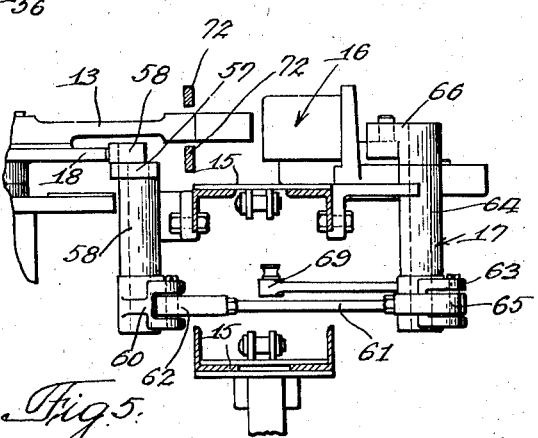
Fig. 5 is a section on the line 5—5 of Fig. 2.

The transmission 20 from the motor to the reservoir 2, rotary head 6, and feed and discharge wheels 13 and 14 shown in Figs. 3 and 4 comprises a horizontal shaft 73 mounted in suitable bearings 74, a clutch connection 75 between this shaft 73 and the motor 19, a gear 76 mounted on this shaft, a gear 77 meshing with the gear 76, a main shaft 78 on which this pinion is mounted, the shaft being mounted in suitable bearings 79 on the base plate 28, a worm 80 rotatable with this shaft, a worm gear 81 mounted on the shaft 30 which carries the reservoir 2 and rotary head 6, another worm 82 mounted on the main drive shaft 78, a worm gear 83 driven from this worm 82, a stud 84 on which this form gear 83 is rotatably mounted, a spur gear 85 rotatable with the worm gear 83, a spur gear 86 mounted on the shaft 87 on which the feed wheel 13 is mounted and meshing with the spur gear 85, and a spur gear 88 mounted on the shaft 89 on which the delivery wheel 14 is mounted and also meshing with the spur gear 85. These vertical shafts 87 and 89 shown in Figs. 2, 3, and 4 are mounted in suitable bearings in bearing brackets 90 and 91 (Figs. 1 and 4) which extend upwardly from the base plate 28. For supporting the containers 5 as they are being shifted by the feed and discharge wheels 13 and 14, a container supporting table 92 (Figs. 1, 2, and 4) is provided underneath the feed and discharge wheels on which table the containers 5 rest as they are moved along by the wheels. Suitable drip pans 93 and 94 are provided underneath the transmission 20. The conveyer 15 may be driven by any suitable transmission (not shown).

It will be seen that the above apparatus provides means for automatically filling containers, one after another, in which the filling apparatus is controlled by the presence or absence of a container in a position to be filled and which can be used with containers formed of pliable material.

Further modifications will be apparent to those skilled in the art and it is desired, therefore, that the invention be limited only by the prior art and the scope of the appended claims.

Having thus described my invention, what I claim and desire to secure by Letters Patent is:

1. A liquid measuring and filling apparatus comprising a liquid reservoir having an opening in its under side, a sleeve slidable in said opening and extending downwardly below said reservoir for engagement with lifting means, a measuring cup in said reservoir open at its top, mounted on said sleeve and movable therewith from a filling position in which its upper edge is below the liquid level in the reservoir to a discharge position in which its upper edge is above said liquid level, and a discharge tube fitting inside said sleeve and fixed with respect to said reservoir and extending downwardly below the reservoir for discharging into a receptacle, said sleeve extending upwardly above the bottom of the cup having a passage affording communication between said measuring cup and discharge tube below the liquid level in the reservoir when the measuring cup is in discharge position and closed when the measurng cup is in filling position.

2. A liquid measuring and filling apparatus comprising a liquid reservoir having an opening in its under side, a sleeve slidable in said opening, a measuring cup in said reservoir open at its top, mounted on said sleeve and movable therewith from a filling position in which its upper edge is below the liquid level in the reservoir to a discharge position in which its upper edge is above said liquid level, a discharge tube fitting inside said sleeve and fixed with respect to said reservoir, said sleeve having a passage affording communication between said measuring cup and discharge tube when the measuring cup is in discharge position and closed when the measuring cup is in filling position, means for presenting a container into filling position with respect to said discharge tube, power means for raising said sleeve to move the measuring cup to discharge position, transmission means between said power means and sleeve, and means for connecting and disconnecting the said transmission between the power means and sleeve controlled by the presence or absence of a container on said presenting means.

3. A liquid measuring and filling apparatus comprising a liquid reservoir rotatable about a substantially vertical axis, a plurality of means rotatable with said reservoir for measuring and discharging a quantity of liquid from said reservoir, container holding means rotatable with said reservoir for presenting containers into filling position with respect to said discharge means, said container holding means comprising a holder carrier rotatable with said reservoir and a plurality of holders, one for each container, reciprocably mounted on said carrier, means for causing up and down movement of each holder to cause the container to move in and out of filling position, transmission means between each holder and one of said discharge means for placing said discharge means in discharge condition during the upward movement of the holder, and means for connecting and disconnecting said transmission between said holder and discharge means controlled by the presence or absence of a container on said holder.

4. A liquid measuring and filling apparatus comprising a liquid reservoir rotatable about a substantially vertical axis, a plurality of means rotatable with said reservoir for measuring and discharging a quantity of liquid from said reservoir, container holding means rotatable with said reservoir for presenting containers into filling position with respect to said discharge means, said container holding means comprising a holder carrier rotatable with said reservoir and a plurality of holders, one for each container, reciprocably mounted on said carrier, means for causing up and down movement of each holder to cause the container to move in and out of filling position, transmission means between each holder and one of said discharge means for placing said discharge means in discharge condition during the upward movement of the holder, said container holding means having a plurality of container receiving pockets opening laterally away from the axis of said container holding means, means for pressing the containers inwardly towards said axis into said pockets, transmission between each holder and one of said discharge means, and means for connecting and disconnecting said transmission between said holder and discharge means controlled in its connecting movement by said inward movement of said container.

OLAF LARSEN.